United States Patent
Talagala et al.

(10) Patent No.: US 6,845,409 B1
(45) Date of Patent: Jan. 18, 2005

(54) DATA EXCHANGE METHODS FOR A SWITCH WHICH SELECTIVELY FORMS A COMMUNICATION CHANNEL BETWEEN A PROCESSING UNIT AND MULTIPLE DEVICES

(75) Inventors: Nisha D. Talagala, Fremont, CA (US); Whay S. Lee, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 471 days.

(21) Appl. No.: 09/624,853

(22) Filed: Jul. 25, 2000

(51) Int. Cl.$^7$ .............................................. G06F 3/00
(52) U.S. Cl. ........................... 710/20; 710/22; 710/48; 710/49; 370/359; 370/360
(58) Field of Search ........................... 710/20, 22, 383, 710/348, 49; 340/2.23, 3.62; 370/235, 359, 360, 423

(56) References Cited

U.S. PATENT DOCUMENTS

| | | | |
|---|---|---|---|
| 4,059,729 A | | 11/1977 | Eddy et al. |
| 5,239,445 A | * | 8/1993 | Parks et al. .................. 361/686 |
| 5,590,375 A | | 12/1996 | Sangveraphunsiri et al. |
| 5,740,397 A | | 4/1998 | Levy |
| 5,894,560 A | * | 4/1999 | Carmichael et al. .......... 710/25 |
| 5,964,848 A | * | 10/1999 | Kikinis et al. ................. 710/2 |
| 6,073,220 A | | 6/2000 | Gunderson |
| 6,275,879 B1 | | 8/2001 | Goodfellow |
| 6,356,998 B2 | * | 3/2002 | Roche ........................ 712/244 |
| 6,446,148 B1 | | 9/2002 | Goodfellow |
| 6,513,091 B1 | * | 1/2003 | Blackmon et al. .......... 710/316 |

OTHER PUBLICATIONS http://www.it.bton.ac.uk/burks/burks/pcinfo/hardware/atafaq/atafq2.html, "Intruction/Hardware," Mar. 24, 2000, 10 pages.

Western Digital, "Enhanced IDE Interface (EIDE)," http://www.wdc.com/products/drivesdrivers-ed/eide.html, Oct. 7, 1998, 3 pages.
Intel, "IDE Controller Functional Description," 2000 Intel Corporation, 10 pages.
Intel, "IDE Controller Register Descriptions (PCI Function 1)," 2000 Intel Corporation, 13 pages.
"Intelligent Disk Drive," Conner Peripherals, Product Manual, Revision 1, Oct. 1990, 9 pages.
Alex T. Ivopol, "IDE–Hardware Reference & Information Document," Jan. 19, 1994, 17 pages.

(List continued on next page.)

*Primary Examiner*—Jeffrey Gaffin
*Assistant Examiner*—Eron Sorrell
(74) *Attorney, Agent, or Firm*—Robert C. Kowert; Meyertons, Hood, Kivlin, Kowert & Goetzel, P.C.

(57) ABSTRACT

A switch is presented including a host input/output (I/O) port adapted for coupling to a controller, multiple device I/O ports each adapted for coupling to at least one device, and logic coupled between the host I/O port and the device I/O ports configured to selectively form a communication channel between the host I/O port and one of the device I/O ports. The switch may operate in a connected mode and a disconnected mode. When in the switch is in the disconnected mode, the logic may not form a communication channel between the host I/O port and any of the device I/O ports. In an ATA embodiment, the switch may comply with an AT attachment (ATA) standard, and thus be an ATA switch. The host I/O port may be adapted for coupling to an ATA controller, the device I/O ports may be adapted for coupling to at least one ATA device, and the logic may selectively form an ATA communication channel between the host I/O port and one of the device I/O ports. Several methods for exchanging data between a processing unit coupled to the host I/O port of the switch and one or more devices coupled to device I/O ports of the switch are described. Several methods for performing direct memory access (DMA) transfers to move data between a memory of the processing unit and one or more of the devices are also described.

26 Claims, 12 Drawing Sheets

OTHER PUBLICATIONS

Promise Technology, Inc., About Promise; White Papers, "A Promising Future: Setting The Trends in IDE," http://www.promise.com/Docs/Papers/trendsetting.html, Jul. 31, 2000, 6 pages.

Promise Technology, Inc., About Promise; White Papers, "Take Your Drives Beyond Ultra Levels of Performance with IDE RAID," http://www.promise.com/Docs/Papers/aboutideraid.html, Jul. 31, 2000, 9 pages.

Promise Technology, Inc., "PCI Card for Ultra ATA/66 Drives; Ultra 66," 1998, 2 pages.

ARCO Computer Products, Inc., User's Manual, "DupliDisk PCI," 1998, 16 pages.

RAIDZONE Technology, "RAIDZONE Technology Overview," 1999 Consensys Corp., 4 pages.

RAIDZONE Technology, "RAIDZONE Frequently Asked Questions," 1999 Consensys Corp., 2 pages.

Winn L. Rosch Hardware Bible, Electronic Edition, "Chapter 9: Storage Interfaces," 1997, 36 pages.

Peter McLean, Information Technology–AT Attachement–3 Interface (ATA–3), Revision 6, Oct. 26, 1995, pp. 1–41 and 120–148.

* cited by examiner

DATA EXCHANGE METHODS FOR A SWITCH WHICH SELECTIVELY FORMS A COMMUNICATION CHANNEL BETWEEN A PROCESSING UNIT AND MULTIPLE DEVICES

CROSS-REFERENCE TO RELATED APPLICATION

This application relates to co-pending application, Ser. No. 09/624,557, filed on the same day as the present application and entitled "SWITCH FOR SELECTIVELY FORMING A COMMUNICATION CHANNEL BETWEEN A PROCESSING UNIT AND MULTIPLE DEVICES, AND ASSOCIATED DATA EXCHANGE METHODS" by Whay S. Lee, which is incorporated herein by reference in its entirety.

BACKGROUND OF THE INVENTION

1. Field of the Invention

This invention relates to computer systems, and more particularly to switches for expanding the connection capabilities of computer systems.

2. Description of the Related Art

Intelligent/Integrated drive electronics (IDE) is an interface technology for mass storage devices (e.g., disk drives) wherein the controller is integrated into the drive. AT attachment (ATA) is disk drive interface standard which implements IDE. As a result, the two terms and their acronyms are often used interchangeably. Several versions of the ATA standard exist, including the basic ATA standard, Fast ATA, ATA-2, Fast ATA-2, ATA-3, and Ultra ATA. As used herein, the term "AT attachment" and the acronym "ATA" refer to all variants of ATA and other interface standards implementing IDE. The basic ATA standard (ANSI X3.221-1994) supports a single 16-bit parallel data channel which may be shared by two separate devices configured as master and slave. A typical modern computer system includes two such ATA controllers, allowing up to four devices with ATA interfaces to be connected to the computer system.

Many different types of ATA storage devices are now available. It is believed that with time more and more computer users will seek the ability to connect more than four ATA storage devices to a computer system via ATA controllers. An existing solution for expanding ATA connectivity of a computer system is to add more ATA controllers to the system (e.g., via expansion cards). However, such added ATA controllers are typically coupled to a single bus of the computer system (e.g., a peripheral component interface or PCI bus). Adding multiple ATA controllers in this manner is typically not only costly, the multiple ATA controllers can also significantly increase communication traffic on the bus to which they are coupled, consequently reducing system performance.

Small computer system interface (SCSI) adapters and devices are readily available, and multiple SCSI storage devices can typically be coupled to a computer system via a single SCSI bus and adapter. However, SCSI components are typically more expensive than similar ATA components, and can be difficult to install. For example, to add SCSI connectivity to a computer system, a SCSI adapter often must be installed in the system (e.g., via an expansion card), and the associated driver software must be installed and configured.

It would thus be desirable to have a switch for expanding the ATA connection capabilities of a computer system. Such a switch would allow multiple, relatively inexpensive ATA devices to be coupled to a computer system which may already include an ATA controller.

SUMMARY OF THE INVENTION

A switch is presented including a host input/output (I/O) port configured to couple to a controller, multiple device I/O ports each configured to couple to at least one device, and logic coupled between the host I/O port and the device I/O ports configured to selectively form a communication channel between the host I/O port and one of the device I/O ports. The switch may operate in a connected mode and a disconnected mode. When the switch is in the disconnected mode, the logic may not form a communication channel between the host I/O port and any of the device I/O ports.

In an ATA embodiment, the switch may comply with an AT attachment (ATA) standard, and thus be an ATA switch. The host I/O port may be configured to couple to an ATA controller, the device I/O ports may be configured to couple to at least one ATA device, and the logic may selectively form an ATA communication channel between the host I/O port and one of the device I/O ports.

The switch may receive commands from the controller via the host I/O port, and a connect command may identify a selected one of the device I/O ports. When the switch is in the disconnected mode and receives the connect command, the switch may enter the connected mode. The logic may respond to the connect command by forming a communication channel between the host I/O port and the selected one of the device I/O ports. The formed communication channel may transparently convey communications of a single selected interface standard (e.g., an ATA standard) between the host I/O port and the selected one of the device I/O ports.

In the ATA embodiment, the connect command may include, for example, three consecutive write commands directed to an address assigned to an ATA standard register (e.g., the ATA standard ALTERNATE STATUS/DEVICE CONTROL register). Further, at least a third write command of the three consecutive write commands may include write data identifying the selected one of the device I/O ports.

When the switch is in the connected mode and receives a disconnect command from the controller, the switch may enter the disconnected mode, and the logic may respond to the disconnect command by breaking the communication channel between the host I/O port and the selected one of the device I/O ports. In the ATA embodiment, the disconnect command may include three consecutive read commands directed to an address assigned to an ATA standard register (e.g., the ATA standard DRIVE HEAD register).

One embodiment of a computer system includes a processing unit including a controller (e.g., an ATA controller) configured to couple to at least one device (e.g., an ATA device), and the above described switch. The host I/O port of the switch may be coupled to the controller. The switch may operate in the connected and disconnected modes as described above, and may respond to connect and disconnect commands from the controller as described above.

The device I/O ports of the switch may include a first device I/O port, and a device (e.g., an ATA device) may be coupled to the first device I/O port. A connect command issued by the controller may identify the first device I/O port. When the switch is in the disconnected mode and receives the connect command, the switch may enter the connected mode as described above. The logic may respond to the connect command by forming a communication channel (e.g., an ATA communication channel) between the host I/O port and the first device I/O port. As described above, the communication channel transparently conveys communications of a single selected interface standard (e.g., an ATA standard) between the host I/O port and the first device I/O port.

When the switch is in the connected mode and receives the disconnect command from the controller, the switch may enter the connected mode, and the logic may respond to the disconnect command by breaking the communication channel between the host I/O port and the first device I/O port.

A general method for issuing a command to a device coupled to a device I/O port of the switch may assume the switch is in the disconnected mode. The processing unit issues the connect command to the switch. As described above, the connect command causes the switch to form a communication channel between the host I/O port and the device I/O port to which the device is coupled. As a result, a communication channel is extended between the processing unit and the device through the switch. With the switch in the connected mode, the processing unit issues a command (e.g., a read or write command) to the device via the communication channel. The processing unit then issues the disconnect command to the switch. As described above, the disconnect command causes the switch to break the communication channel between the host I/O port and the device I/O port to which the device is coupled. As a result, the communication channel between the processing unit and the device through the switch is broken.

The switch may provide for data exchanges between the processing unit and one or more devices coupled to the device I/O ports of the switch using programmed input/output (PIO) techniques and/or direct memory access (DMA) techniques.

One method for exchanging data between the processing unit and multiple devices coupled to the device I/O ports of the switch uses a first PIO technique, wherein several devices may be serviced during execution of a single interrupt service routine. The processing unit issues separate commands to each of the devices (e.g., by repeated application of the general command issue method described above). The processing unit receives an interrupt signal from one of the devices (e.g., via the switch), wherein the interrupt signal conveys a request for service. The processing unit performs an interrupt service routine in response to the interrupt signal. During the interrupt service routine, interrupt signals from all of the devices may be masked. The processing unit reads the contents of an addressable register of the switch during the interrupt service routine, wherein the contents of the register is indicative of interrupt signals from the devices. The register may be, for example, the register of the register set mapped to the address of the ATA standard CYLINDER LOW register. In addition to servicing the device that caused the interrupt, the interrupt service routine may check the register in the switch that indicates the interrupt status for all of the device I/O ports of the switch. If any other interrupts are pending, the interrupt service routine may service those as well before returning. Thus, interrupts from multiple devices attached to different device I/O ports of the switch may be serviced during a single invocation of the interrupt service routine. Servicing multiple IRQs in a single pass through the interrupt service routine may reduce interrupt handling overhead (e.g. by reducing context switching and other overhead associated with going in and out of an interrupt service routine).

Another method for exchanging data between the processing unit and multiple devices coupled to the device I/O ports of the switch uses a second PIO technique, wherein servicing of the devices is batched by masking interrupts from all but a small subset of the devices. The processing unit issues separate commands to each of the devices (e.g., by repeated application of the general command issue method described above). The processing unit masks interrupt signals from all but a select subset of the devices. The processing unit receives an interrupt signal from one of the devices within the select subset of devices (e.g., via the switch), wherein the interrupt signal conveys a request for service. The processing unit performs an interrupt service routine in response to the interrupt signal. During the interrupt service routine, interrupt signals from all of the devices may be masked. The processing unit reads the contents of an interrupt status register of the switch during the interrupt service routine, wherein the contents of the register is indicative of interrupt signals from the devices for each device I/O port of the switch. The register may be, for example, the register of the register set mapped to the address of the ATA standard CYLINDER LOW register, where in the disconnected mode the register services as an interrupt status register. The processing unit may service other devices in addition to the one that caused the interrupt dependent upon the contents of the register. A register may be provided in the switch for masking an interrupt request associated with each device I/O port. This register may be set to mask interrupts from devices expected to be received first after a series of commands has been issued to devices on different ports of the switch. This may increase the likelihood that the processing unit will not be interrupted until multiple ones of the devices are ready for service, since only the subset of devices expected to finish last were left unmasked. Therefore, when the interrupt is serviced, multiple devices may be serviced during the same invocation of the interrupt service routine. The subset size and mask choices in the switch interrupt mask register may allow a trade off to be made between interrupt handling latency and interrupt handling efficiency.

An alternate method for exchanging data between the processing unit and multiple devices coupled to the device I/O ports of the switch uses a third PIO technique, wherein polling is used to service the devices. The processing unit issues separate commands to each of the devices (e.g., by repeated application of the general command issue method described above). The processing unit masks interrupt signals from all of the devices. The processing unit reads the contents of an addressable register of the switch, wherein the contents of the register is indicative of interrupt signals from the devices. The register may be, for example, the register of the register set mapped to the address of the ATA standard CYLINDER LOW register. The processing unit services the devices dependent upon the contents of the register. This technique may allow to avoid overhead associated with interrupt handling. The interrupt mask register in the switch may be used to mask all interrupts from each switch device I/O port from interrupting the processing unit. Device service requests may be handled under control of driver software by example which may periodically or occasionally poll the interrupt status switch and decide the best manner in which to service the devices.

One method for moving data between a memory of the processing unit and a device coupled to one of the device I/O ports of the switch uses a first DMA technique, wherein a DMA transfer is set up while the device is carrying out a command. The processing unit issues a command to the device (e.g., using the general command issue method described above). The processing unit sets up a DMA transfer between the memory and the device. For example, a central processing unit (CPU) of the processing unit may configure a DMA controller of the processing unit for the DMA transfer. The processing unit receives a DMA request (DMARQ) signal from the device via the switch, wherein the DMARQ signal conveys a request for DMA transfer. The processing unit initiates the DMA transfer in response to the DMARQ signal. During the DMA transfer, data is moved between the memory and the device via a communication channel formed through the switch such that the data passes through the switch. The processing unit receives an interrupt signal from the device (e.g., via the switch), wherein the interrupt signal indicates data movement completion.

Another method for moving data between the memory and multiple devices coupled to the device I/O ports of the switch uses a second DMA technique, wherein DMA transfers are initiated as the devices are ready to move data. The processing unit issues separate commands to each of the devices (e.g., by repeated application of the general command issue method described above). The processing unit reads an addressable register of the switch, wherein the contents of the register is indicative of DMA request signals from the devices. The register may be, for example, the register of the register set mapped to the address of the ATA standard CYLINDER HIGH register, where the register responds in the disconnected mode to provide DMA request status for each device I/O port of the switch. In response to a DMA request from one of the devices, the processing unit forms a communication channel between the processing unit and the device generating the DMA request signal. For example, the processing unit may issue a connect command to the switch indicating the device I/O port to which the device generating the DMA request signal is coupled. As a result, a communication channel is extended between the processing unit and the device generating the DMA request signal through the switch. The processing unit initiates a DMA transfer between the memory and the device. The processing unit receives an interrupt signal from the device, wherein the interrupt signal indicates data movement completion.

Using this second DMA technique, commands may be issued to devices on different ports of the switch in parallel. The DMA status register in the switch allows the controlling software to wait until a device is ready for the DMA transfer (e.g. device asserts a DMA request signal on one of the switch ports), before setting up the DMA transfer (e.g. programming the DMA controller, etc.). Devices attached to other device I/O ports of the switch may be completing operations in preparation of their own DMA transfers while a current DMA transfer is being setup and completed. Also, the handling of the interrupt requests indicating the completion of a DMA transfer may be handled according to one of the interrupt handling techniques described herein. One such interrupt handling example is described as follows.

An alternate method for moving data between the memory and multiple devices coupled to the device I/O ports of the switch uses a third DMA technique, wherein a DMA batch method is implemented by masking interrupts from all of the devices and polling interrupt signals to determine when all commands have been completed. The processing unit issues separate commands to each of the devices in sequence via the switch (e.g., by repeated application of the general command issue method described above). The processing unit masks interrupt signals from all of the devices. The processing unit performs multiple DMA transfers (e.g., in response to DMARQ signals received from the devices via the switch), wherein each DMA transfer moves data between the memory and a different one of the devices. The processing unit polls the contents of an addressable register of the switch. The contents of the register is indicative of interrupt signals from the devices, and the data movement is complete when interrupt signals are received from all of the devices. The register may be, for example, the register of the register set mapped to the address of the ATA standard CYLINDER LOW register.

A method for exchanging data between the processing unit and a device coupled to one of the device I/O ports of the switch includes an optimization wherein a number of connect and disconnect processes (i.e., connect/disconnect sequences) to communicate with the device are reduced. The method may be applied where multiple connect/disconnect sequences are performed in sequence to pass commands to the device, and at least one of the commands causes the device to produce data in response. The processing unit issues a first command to the device (e.g., via the general command issue method described above), wherein the device produces data in response to the first command. After issuing the first command the disconnect sequence may be performed an a connect sequence to another port performed where a command to another device may be issued. The devices may be, for example, data storage devices, and the first command may be a read command.

When the device has data ready in regard to the first command, the processing unit forms a communication channel between the processing unit and the device. For example, the processing unit may issue the connect command to the switch indicating the device I/O port to which the device is coupled. As a result, a communication channel is extended between the processing unit and the device through the switch. The processing unit receives the data from the device via the communication channel. While the communication channel still exists, the processing unit issues a second command to the device via the communication channel. The processing unit breaks the communication channel between the processing unit and the device. For example, the processing unit may issue the disconnect command to the switch. As a result, the switch breaks the communication channel between the processing unit and the device. By issuing a subsequent command during the same connect period for completing a previous command, a total number of connect/disconnect sequences may be reduced.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
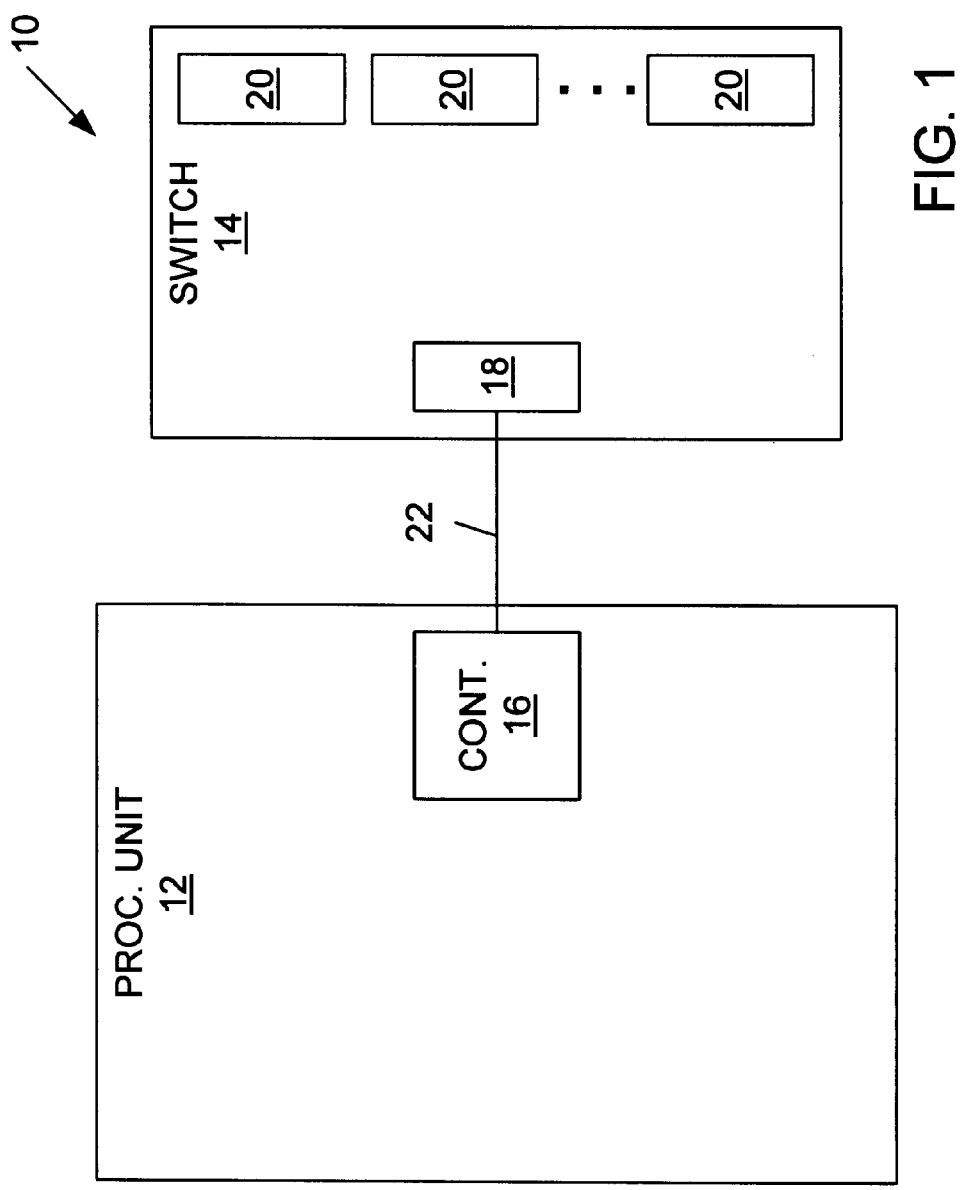
FIG. 1 is a diagram of one embodiment of a computer system including a processing unit coupled to a switch.

FIG. 1 is a diagram of one embodiment of a computer system 10 including a processing unit 12 coupled to a switch 14 (e.g., an ATA switch). Processing unit 12 includes a controller 16 (e.g., an ATA controller) adapted for coupling to one or more devices (e.g., ATA devices such as disk drives, CD-ROM drives, tape drives, etc.). Switch 14 includes a host input/output (I/O) port 18 and multiple device I/O ports 20. Host I/O port 18 is adapted for coupling to a controller (e.g., an ATA controller), and each device I/O port 22 is adapted for coupling to a device (e.g., an ATA device such as a disk drive, a CD-ROM drive, or a tape drive, or another switch). In FIG. 1, controller 16 is coupled to host port 18 via a bus 22. Controller 16 and bus 22 may conform to AT attachment (ATA) standard ANSI X3.221-1994, or any other ATA standard or variant thereof. As will be described in detail below, switch 14 is configured to form a communication channel (e.g., an ATA communication channel) between host I/O port 18 and one of the device I/O ports 20 in response to commands from processing unit 12, thus forming a communication channel between processing unit 12 and a device (e.g., an ATA device) coupled to the device I/O port.

Figure 2:
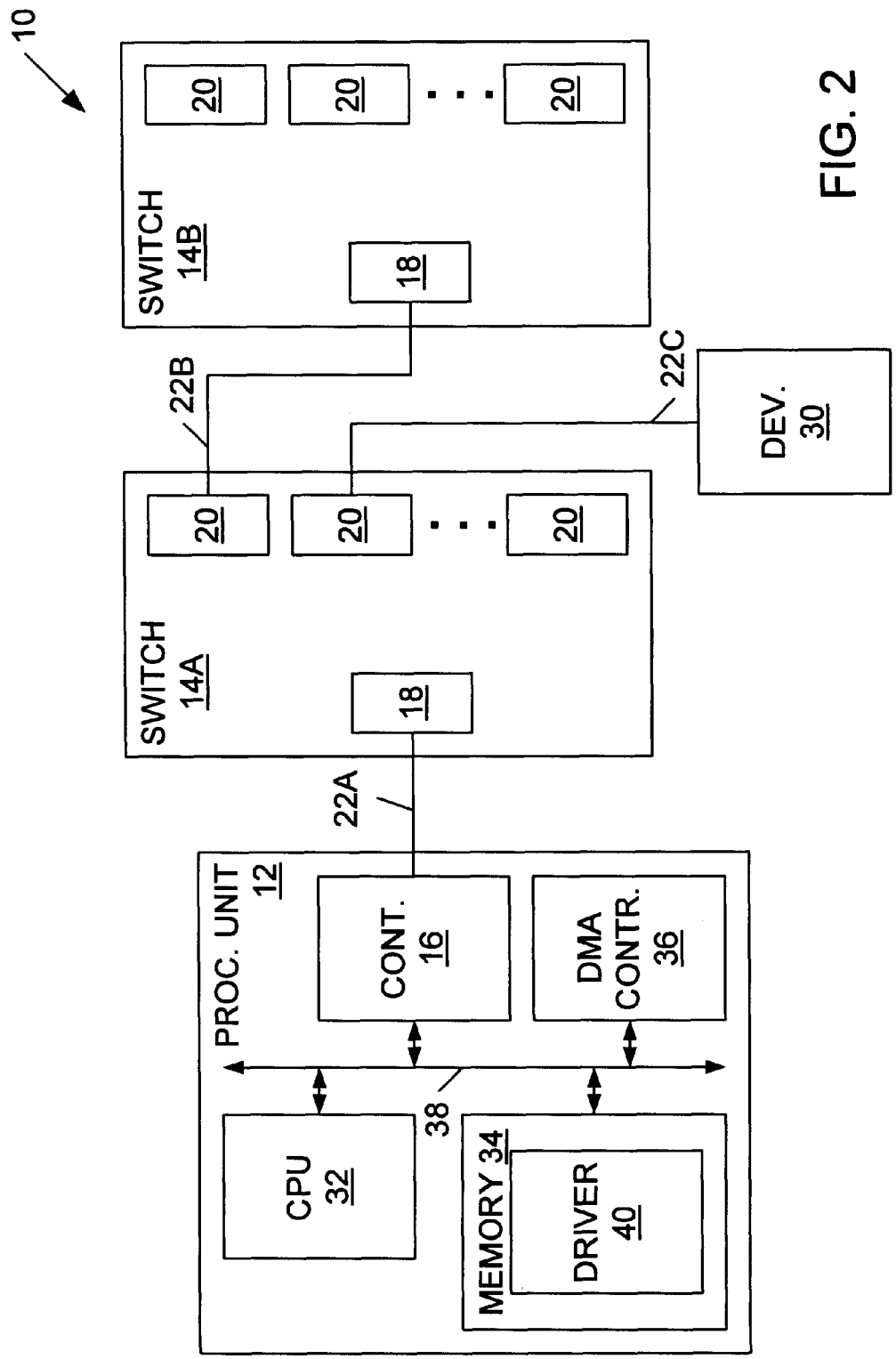
FIG. 2 is a diagram of an alternate embodiment of the computer system of FIG. 1 wherein the processing unit is coupled to two switches in a series cascaded arrangement.

FIG. 2 is a diagram of an alternate embodiment of computer system 10 of FIG. 1 wherein processing unit 12 is coupled to two switches 14A and 14B in a series cascaded arrangement. Components of computer system 10 shown in FIG. 1 and described above are labeled similarly in FIG. 2. Host I/O port 18 of a first switch 14A is coupled to controller 16 of processing unit 12 via a first bus 22A, and host I/O port 18 of a second switch 14B is coupled to a first device I/O port 20 of switch 14A via a second bus 22B. A device 30 (e.g., an ATA device) is coupled to a second device I/O port 20 of switch 14A via a third bus 22C. Device 30 may be, for example, a disk drive (e.g., a hard disk drive or a floppy disk drive), a compact disk read only memory (CD-ROM) drive, or a tape drive.

It is noted that other ATA devices may be coupled to other device I/O ports 20 of switches 14A and 14B. For example, up to two ATA devices, or a single switch, may be coupled to each device I/O port 20.

In the embodiment of FIG. 2, processing unit 12 includes a central processing unit (CPU) 32, a memory 34, and a direct memory access (DMA) controller 36 coupled to a bus 38. Controller 16 is also coupled to bus 38. CPU 32 executes software instructions stored within memory 34. A driver 40 (e.g., an ATA driver) resides within memory 34 and includes software instructions. CPU 32 communicates with devices coupled to controller 16 (e.g., via switches 14A and 14B) by executing software instructions of driver 40.

For example, while executing software instructions of driver 40, CPU 32 may issue a command to switch 14A which causes switch 14A to form a communication channel between host I/O port 18 and the second device I/O port 20 to which device 30 is coupled. A communication channel is thus formed between CPU 32 and device 30. Instructions of driver 40 may cause CPU 32 to issue a command to device 30 (e.g., a read or write command). Once the command, and any write data, is conveyed to device 30, instructions of driver 40 may cause CPU 32 to issue a command to switch 14A which causes switch 14A to break the communication channel between host I/O port 18 and the first device I/O port 20. CPU 32 may then issue other commands to other devices coupled to device I/O ports 20 of switch 14A or 14B. When CPU 32 issues a read command to device 30, instructions of driver 40 may cause CPU 32 to wait for a signal from device 30 indicating a readiness to transfer data produced in response to the read command. While waiting for the signal from device 30, CPU 32 may issue other commands to other devices coupled to device I/O ports 20 of switch 14A or 14B.

Figure 3A:
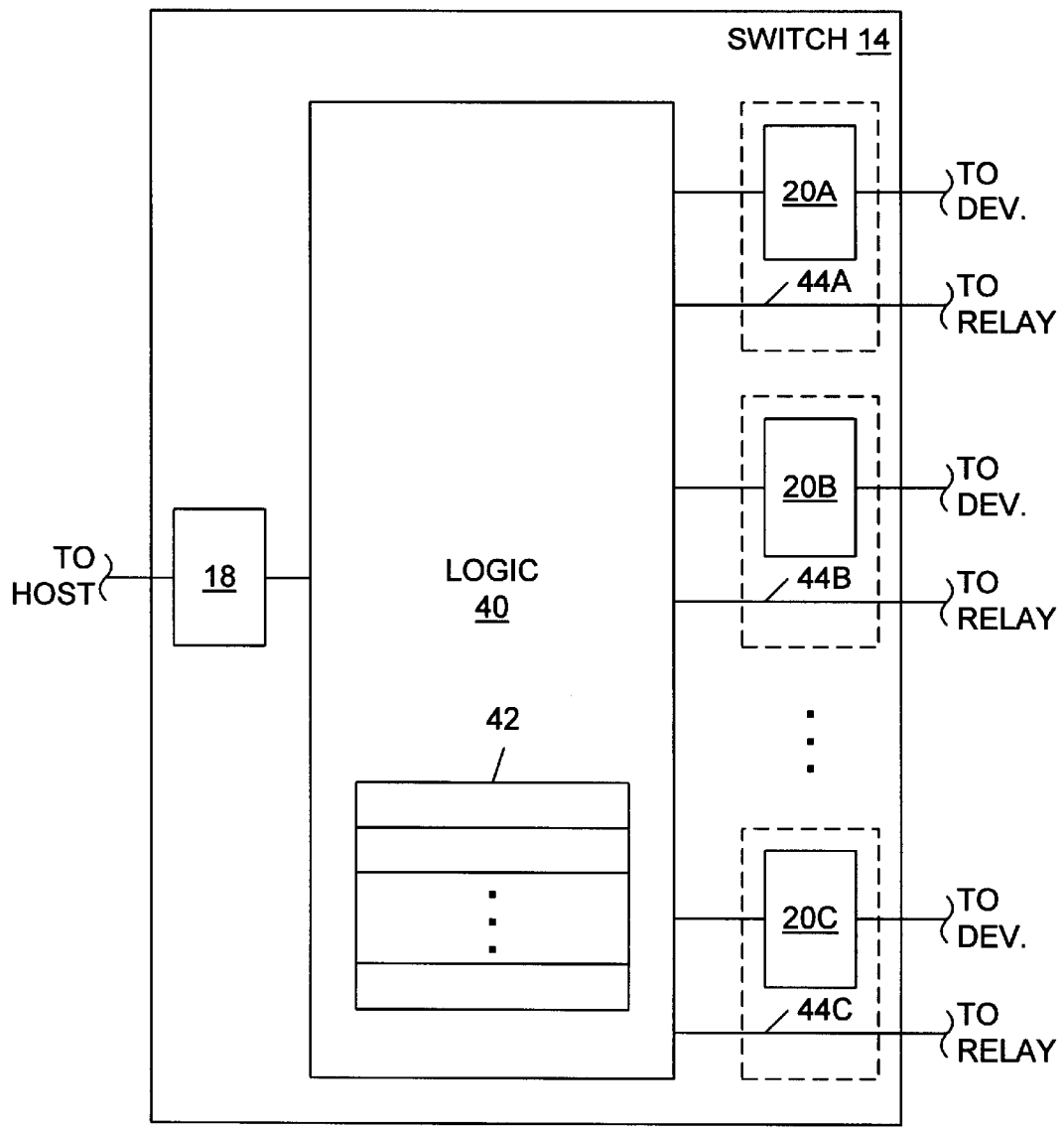
FIG. 3A is a diagram of one embodiment of the switches of FIGS. 1 and 2.

FIG. 3A is a diagram of one embodiment of each switch 14 of FIGS. 1 and 2. Components of switch 14 shown in FIGS. 1 and 2 and described above are labeled similarly in FIG. 3A. In the embodiment of FIG. 3A, switch 14 includes logic 40 coupled between host I/O port 18 and device I/O ports 20A–20C. Host I/O port 18 is coupled to a host (e.g., a controller). Logic 40 includes a register set 42. In one embodiment, register set 42 includes addressable registers mapped to ATA defined addresses. The registers of register set 42 may be accessed via host I/O port 18.

In the embodiment of FIG. 3A, logic 40 produces multiple power staging signals 44A–44C. One or more power supplies external to switch 14 may supply electrical power to devices coupled to device I/O ports 20A–20C through separate power supply relays external to switch 14. Power staging signals 44A–44C may be supplied to control terminals of the external power supply relays in order to facilitate selective application of electrical power to the devices.

Figure 3B:
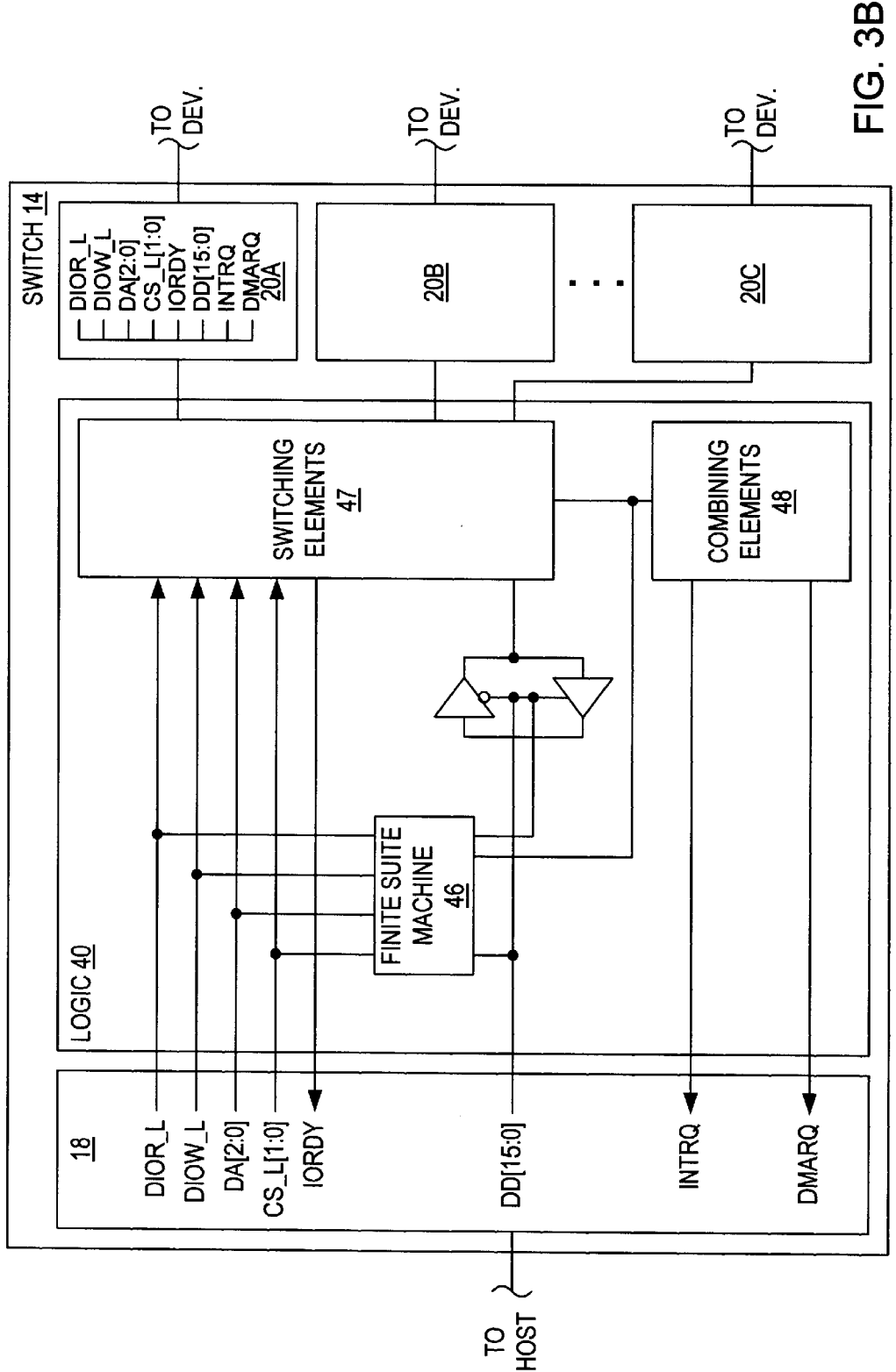
FIG. 3B is a diagram of an ATA embodiment of the switch of FIG. 3A including signals defined by ATA standards, according to one embodiment.

FIG. 3B is a diagram of an ATA embodiment of switch 14 of FIG. 3A including signals defined by ATA standards. Components of switch 14 shown in FIGS. 1–3 and described above are labeled similarly in FIG. 3B. In the embodiment of FIG. 3B, logic 40 includes a finite state machine 46, switching elements 47, and combining elements 48. Finite state machine 46 performs control functions within logic 40. Switching elements 47 are coupled between host I/O port 18 and device I/O ports 20A–20C. Finite state machine 46 may receive commands from a controller coupled to host I/O port 18 (e.g., controller 16 in FIG. 2), and may respond to the commands by producing and providing commands to switching elements 47. Switching elements 47 may respond to the commands from finite state machine 46 by forming an ATA communication channel between host I/O port 18 and one of the device I/O ports 20A–20C. Combining elements 48 may receive separate interrupt and direct memory access (DMA) request signals from devices coupled to device I/O ports 20A–20C via switching elements 47, and may combine the separate interrupt and DMA request signals to produce a single interrupt request signal (INTRQ) and a single DMA request signal (DMARQ) for switch 14.

Figure 4:
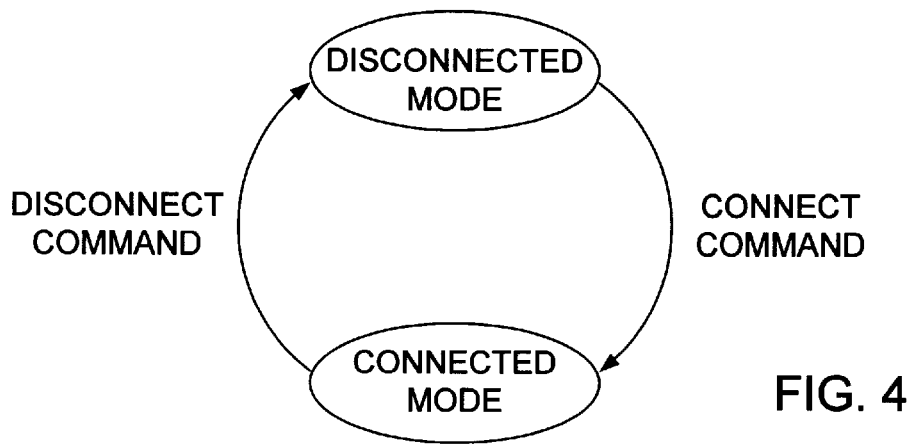
FIG. 4 is a diagram illustrating operating modes of the switch of FIG. 3A, according to an embodiment.

FIG. 4 is a diagram illustrating operating modes of switch 14 of FIG. 3A. As shown in FIG. 4, switch 14 operates in two modes: a "connected" mode and a "disconnected" mode. In the disconnected mode, logic 40 does not form a communication channel between host I/O port 18 and any device I/O port 20. When in the disconnected mode and switch 14 receives a "connect" command, switch 14 transitions from the disconnected mode to the connected mode. The connect command identifies a selected one of the device I/O ports 20. In the connected mode, logic 40 forms a communication channel between host I/O port 18 and the selected one of the device I/O ports 20.

The communication channel formed between host I/O port 18 and the selected one of device I/O ports 20 in the connected mode transparently conveys communications between host I/O port 18 and the selected one of device I/O ports 20. For example, the communication channel may provide a bi-directional path for communications according to the ATA standard between host I/O port 18 and the selected one of device I/O ports 20. In the connected mode, switch 14 conveys a communication received at the host I/O port 18 to the selected one of device I/O ports 20. Switch 14 also conveys a communication received at the selected one of device I/O ports 20 to host I/O port 18. Thus in the connected mode, and except for the disconnect command, switch 14 is completely transparent to the controller coupled to host I/O port 18, and is transparent to the device coupled to the selected one of device I/O ports 20.

When in the connected mode and switch 14 receives a "disconnect" command, switch 14 transitions from the connected mode to the disconnected mode. During a transition from the connected mode to the disconnected mode, logic 40 breaks the communication channel between host I/O port 18 and the selected one of the device I/O ports 20.

In one embodiment, switch 14 includes several registers mapped to the addresses of ATA standard registers. In addition, logic 40 may include monitoring logic (e.g., within finite state machine 46 of FIG. 3B) which monitors accesses to ATA standard registers. Table 1 below lists ATA standard registers, allowable operations of the ATA standard registers, and corresponding functions of switch 14 in an exemplary embodiment.

TABLE 1

Standard ATA Registers And Exemplary Corresponding Switch Functions.

| Standard ATA Register | Allowable Operations | Corresponding Switch Functions |
|---|---|---|
| DATA | Read/Write | DMARQS\|INTRQS |
| ERROR/WRITE PRE. | Read/Write | — |
| SECTOR COUNT | Read/Write | INTRQMSK |
| SECTOR NUMBER | Read/Write | DMARQMSK |
| CYLINDER LOW | Read/Write | INTRQS |
| CYLINDER HIGH | Read/Write | DMARQS |
| DRIVE/HEAD | Read/Write | DISCONNECT |
| STATUS/COMMAND | Read/Write | POWER BITMAP |
| ALT. STAT./DEV. CONT. | Read/Write | CONNECT/BUS SEL. |
| DEV. ADDRESS | Read/Write | — |

In one embodiment, switch 14 has 8 device I/O ports 20, and produces 8 corresponding power staging signals 44. During initialization of a system including switch 14 (e.g., following initial power up or a reset condition), processing unit 12 writes an 8-bit POWER BITMAP value to the STATUS/COMMAND register of register set 42 of switch 14. Each of the 8 bits of the POWER BITMAP is associated with a different one of the 8 power staging signals 44. Logic 40 produces the 8 power staging signals 44 according to the value of the corresponding bit of the POWER BITMAP. When activated by a given power staging signal, an external relay may provide one or more power supply voltages from an external power supply to a device coupled to the associated device I/O port 20.

Providing the POWER BITMAP value allows processing unit 12 to control the timing of application of power to devices coupled to device I/O ports 20 of switch 14. For example, by writing different POWER BITMAP values to the STATUS/COMMAND register of switch 14 in sequence, processing unit 12 may cause the sequential application of power to the devices. Such sequential application of power may be performed in order to reduce transient loading of one or more external power supplies. Processing unit 12 may also modify the POWER BITMAP value stored in the STATUS/COMMAND register to remove power from a malfunctioning device.

During the initialization of the system and following receipt and handling of the POWER BITMAP value, control circuitry of logic 40 may receive the connect command. In response to the connect command, control circuitry of logic 40 may issue a control signal to logic 40 which causes logic 40 to provide a bi-directional communication channel between host I/O port 18 and the selected one of the multiple device I/O ports 20 identified by the connect command (e.g., the first device I/O port 20 to which device 30 is coupled).

As described above, switch 14 operates in either the connected mode or the disconnected mode. When in the disconnected mode and switch 14 receives the connect command, switch 14 transitions from the disconnected mode to the connected mode. Control circuitry of logic 40 responds to the connect command by issuing a control signal to logic 40 which causes logic 40 to form the communication channel between host I/O port 18 and the selected one of the device I/O ports 20 identified by the connect command.

When in the connected mode and switch 14 receives the disconnect command, switch 14 transitions from the connected mode to the disconnected mode. Logic 40 of switch 14 responds to the disconnect command by issuing a control signal to logic 40 which causes logic 40 to break the communication channel between host I/O port 18 and the selected one of the device I/O ports 20. In the disconnected mode, control circuitry of logic 40 is the recipient of all ATA signals received via host I/O port 18, and no ATA signals received via host I/O port 18 are conveyed to any of the device I/O ports 20.

In one embodiment, the connect and disconnect commands include pre-defined sequences of read or write commands to addresses assigned to ATA standard registers. For example, the disconnect command may include a "disconnect sequence." The disconnect sequence may be, for example, three consecutive read commands to a selected one of the ATA standard registers (i.e., a "DISCONNECT" register).

The DISCONNECT register is a register selected from the set of ATA standard registers which may be read without causing an adverse side effect. For example, the STATUS/COMMAND register is a poor candidate for selection as the DISCONNECT register as reading the STATUS/COMMAND register clears an interrupt signal. As indicated in Table 1, a register of register set 42 mapped to the address of the ATA standard DRIVE/HEAD register may function as the DISCONNECT register. Accordingly, in one embodiment, monitoring logic of logic 40 monitors accesses to the ATA standard DRIVE/HEAD register in the connected mode. When the monitoring logic detects three consecutive read commands to the DRIVE/HEAD register, switch 14 transitions from the connected mode to the disconnected mode.

Similarly, the connect command may include a "connect sequence." The connect sequence may be, for example, three consecutive write commands to a selected one of the ATA standard registers (i.e., a "CONNECT" register). As indicted in Table 1, a register of register set 42 mapped to the address of the ATA standard ALTERNATE STATUS/DEVICE CONTROL register may function as the CONNECT register. Accordingly, in one embodiment, the monitoring logic of logic 40 monitors accesses to the register of register set 42 mapped to the address of the ATA standard ALTERNATE STATUS/DEVICE CONTROL register in the disconnected mode. When the monitoring logic detects three consecutive write commands to the register of register set 42 mapped to the address of the ATA standard ALTERNATE STATUS/DEVICE CONTROL register, switch 14 transitions from the connected mode to the disconnected mode.

In one embodiment, a "BUS SELECTION" value written to the CONNECT register during the connect sequence indicates the device I/O port 20 to be bi-directionally coupled to host I/O port 18. In one embodiment, the register mapped to the address of the ATA standard ALTERNATE STATUS/DEVICE CONTROL register thus also stores the BUS SELECTION value as indicated in Table 1 above. For example, in the embodiment with 8 device I/O ports 20, the low-ordered three bits of the BUS SELECTION value may indicate the device I/O port 20 to be bi-directionally coupled to host I/O port 18. It is noted that should processing unit 12 inadvertently issue the disconnect sequence, processing unit 12 may read the BUS SELECTION value from the CONNECT register and use the BUS SELECTION value to reestablish connection to a device.

When switch 14 is in the connected mode and processing unit 12 issues a disconnect command, switch 14 forwards the disconnect command to any devices coupled to the selected device I/O port 20. If a switch is coupled to the selected device I/O port 20, both switches enter the disconnected mode simultaneously, along with any other switches coupled to a selected device I/O port of the second switch. Thus when processing unit 12 issues a disconnect command via a communication channel, all switches along the communication channel enter the disconnected mode simultaneously.

Following issuance of a disconnect command, a separate connect command is required to extend a communication channel through each switch. Thus where multiple switches 14 are coupled together in a cascaded arrangement, multiple connect commands may be necessary to form a communication channel between processing unit 12 and a target device. For example, in the embodiment of FIG. 2, a first connect command issued by controller 16 may identify the device I/O port 20 of switch 14A to which switch 14B is coupled. Switch 14A may receive the first connect command and enter the connected mode. With switch 14A in the connected mode, the communication channel originating from controller 16 is extended through switch 14A to switch 14B. A second connect command issued by controller 16 may identify a device I/O port 20 of switch 14B to which a target device is coupled. In the connected mode, switch 14A is transparent, and conveys the second connect command to switch 14B. Switch 14B may receive the second connect command and enter the connected mode. With switch 14B in the connected mode, the communication channel originating from controller 16 is extended through switch 14B to the target device.

Processing unit 12 may issue several commands to several devices coupled to processing unit 12 via a switch 14. Processing unit 12 may, for example, issue a first connect command to connect to a first device coupled to a first device I/O port of switch 14, issue a command to the first device, and issue the disconnect command to disconnect from the first device. Processing unit 12 may then immediately issue a second connect command to connect to a second device coupled to a second device I/O port of the switch 14, issue a command to the second device, and issue the disconnect command to disconnect from the second device. Processing unit 12 may then wait for responses from the two devices indicating a readiness to transfer data (e.g., interrupt signals). Processing unit 12 may service the two devices in the order the responses are received.

It is noted that only minimal modification of standard driver software may be required to support switch 14. For example, modifications to standard driver software required to support switch 14 includes adding instructions to issue the connect and disconnect commands (e.g., sequences). In embodiments where the disconnect command is a sequence of three consecutive reads to the DRIVE/HEAD register, the standard driver software may be modified to insert a read to the ALTERNATE STATUS/DEVICE CONTROL register after every read to the DRIVE/HEAD register in order to prevent inadvertent issue of the disconnect sequence.

When switch 14 is in the disconnected mode, reads to the DISCONNECT register may return switch identification information (e.g., a text string indicating a revision number of switch 14). Processing unit 12 may perform such a read in order to interrogate switch 14 and/or positively confirm that switch 14 is in the disconnected mode before issuing a connect command.

In one embodiment, when switch 14 is in the disconnected mode, logic 40 receives the interrupt request (INTRQ) signals via the eight device I/O ports 20, concatenates the values of the INTRQ signals to form the INTRQS indicated in Table 1, and stores the INTRQS value in a register of register set 42 mapped to the address of the ATA standard CYLINDER LOW register as indicated in Table 1. Logic 40 also receives the direct memory access (DMA) request (DMARQ) signals via the eight device I/O ports 20, concatenates the values of the DAMRQ signals to form the DMARQS value of Table 1, and stores the DMARQS value in a register of register set 42 mapped to the address of the ATA standard CYLINDER HIGH register as indicated in Table 1. When in the disconnected mode, logic 40 responds to a read of the ATA standard DATA register by concatenating the DMARQS and the INTRQS values and returning the resultant DMARQS|INTRQS value as indicated in Table 1.

In one embodiment, when switch 14 is in the disconnected mode, switch 14 receives an interrupt mask (INTRQMSK) value and a DMA request mask (DMARQMSK) value from processing unit 12 via host I/O port 18. The INTRQMSK and DAMRQMSK values are 8-bit mask bytes. Processing unit 12 writes the INTRQMSK value to a register of register set 42 mapped to the address of the ATA standard SECTOR COUNT register, and writes the DMARQMSK value to a register of register set 42 mapped to the address of the ATA standard SECTOR NUMBER register. The INTRQMSK and DMARQMSK values allow processing unit 12 to selectively respond to interrupt and DMA requests. Logic 40 masks the eight bits of the INTRQS value using the INTRQMSK byte to form a masked result, then drives the ATA defined INTRQ signal terminal of host I/O port 18 with a logical OR of the bits of the masked result. Similarly, logic 40 masks the eight bits of the DMARQS value using the DMARQMSK byte to form a masked result, then drives the ATA defined DMARQ signal terminal of host I/O port 18 with an logical OR of the bits of the masked result.

Figure 5:
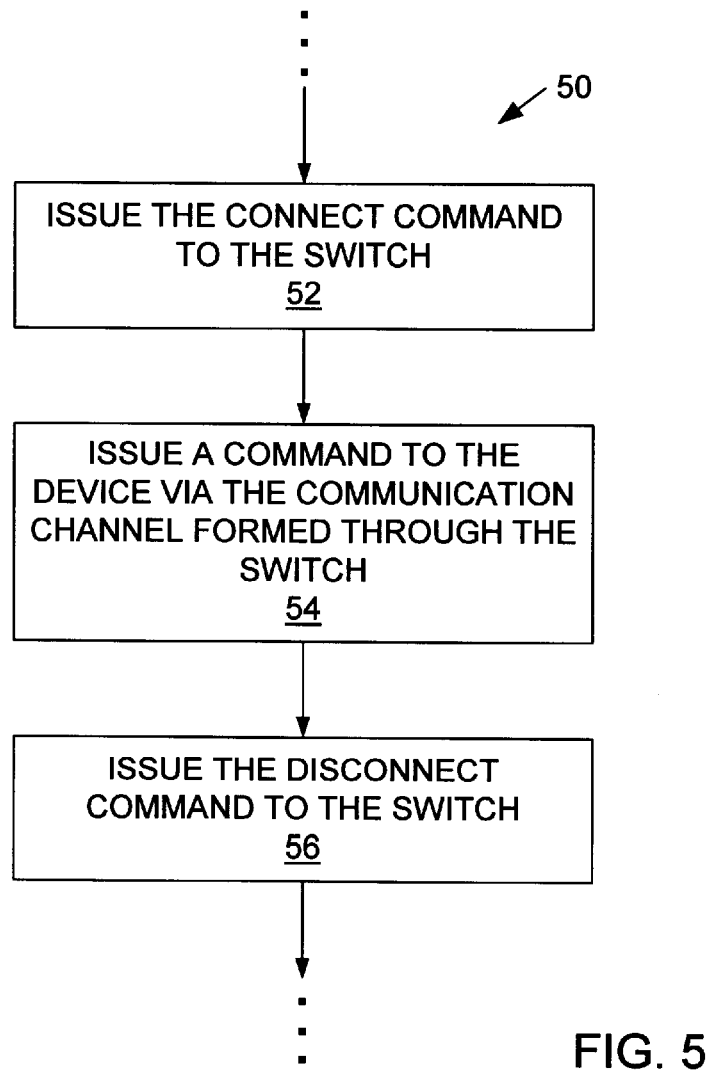
FIG. 5 is a flow chart of one embodiment of a general method for issuing a command to a device coupled to a device I/O port of the switch of FIGS. 1–3.

FIG. 5 is a flow chart of one embodiment of a general method 50 for issuing a command to a device coupled to a device I/O port 20 of switch 14. Switch 14 is assumed to be in the disconnected mode. During a step 52, processing unit 12 issues the connect command to switch 14. As described above, the connect command causes switch 14 to form a communication channel between host I/O port 18 and the device I/O port 20 to which the device is coupled. As a result, a communication channel is extended between processing unit 12 and the device through switch 14. With switch 14 in the connected mode, processing unit 12 issues a command (e.g., a read or write command) to the device via the communication channel during a step 54. During a step 56, processing unit 12 issues the disconnect command to switch 14. As described above, the disconnect command causes switch 14 to break the communication channel between host I/O port 18 and the device I/O port 20 to which the device is coupled. As a result, the communication channel between processing unit 12 and the device through switch 14 is broken.

Switch 14 may provide for data exchanges between processing unit 12 and one or more devices coupled to device I/O ports 20 of switch 14 using programmed input/output (PIO) techniques and/or direct memory access (DMA) techniques.

Figure 6:
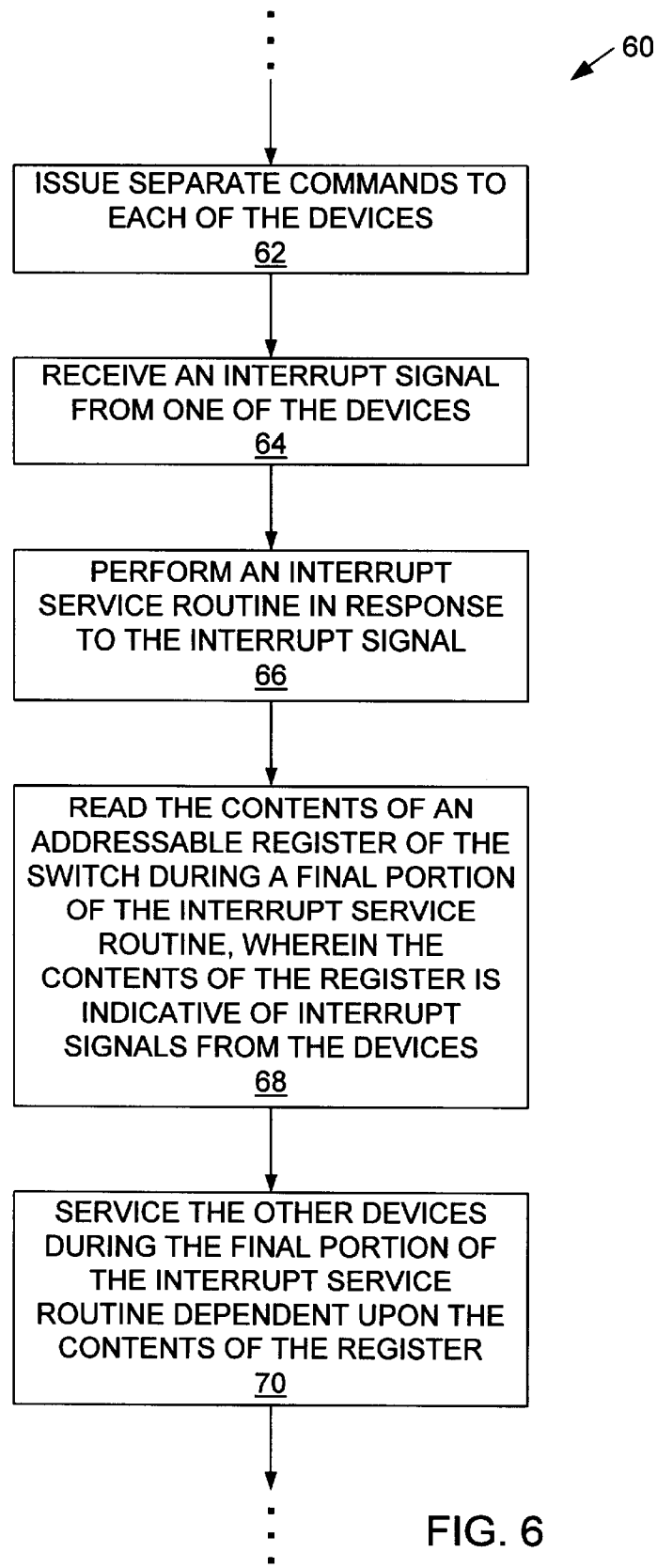
FIG. 6 is a flow chart of one embodiment of a method for exchanging data between the processing unit and multiple devices coupled to device I/O ports of the switch using a first PIO technique, wherein several of the devices may be serviced during execution of a single interrupt service routine.
Figure 7:
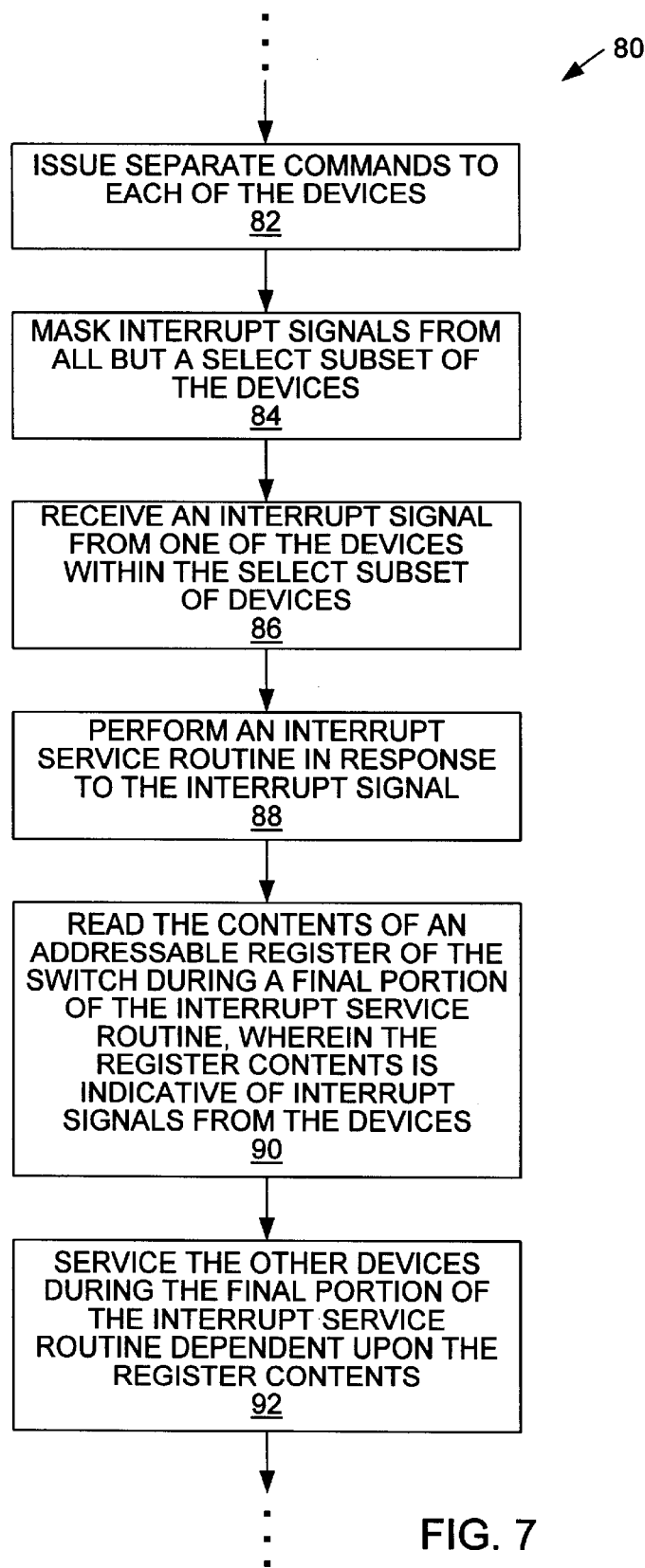
FIG. 7 is a flow chart of one embodiment of a method for exchanging data between the processing unit and multiple devices coupled to device I/O ports of the switch using a second PIO technique, wherein servicing of the devices is batched by masking interrupts from all but a small subset of the devices.
Figure 8:
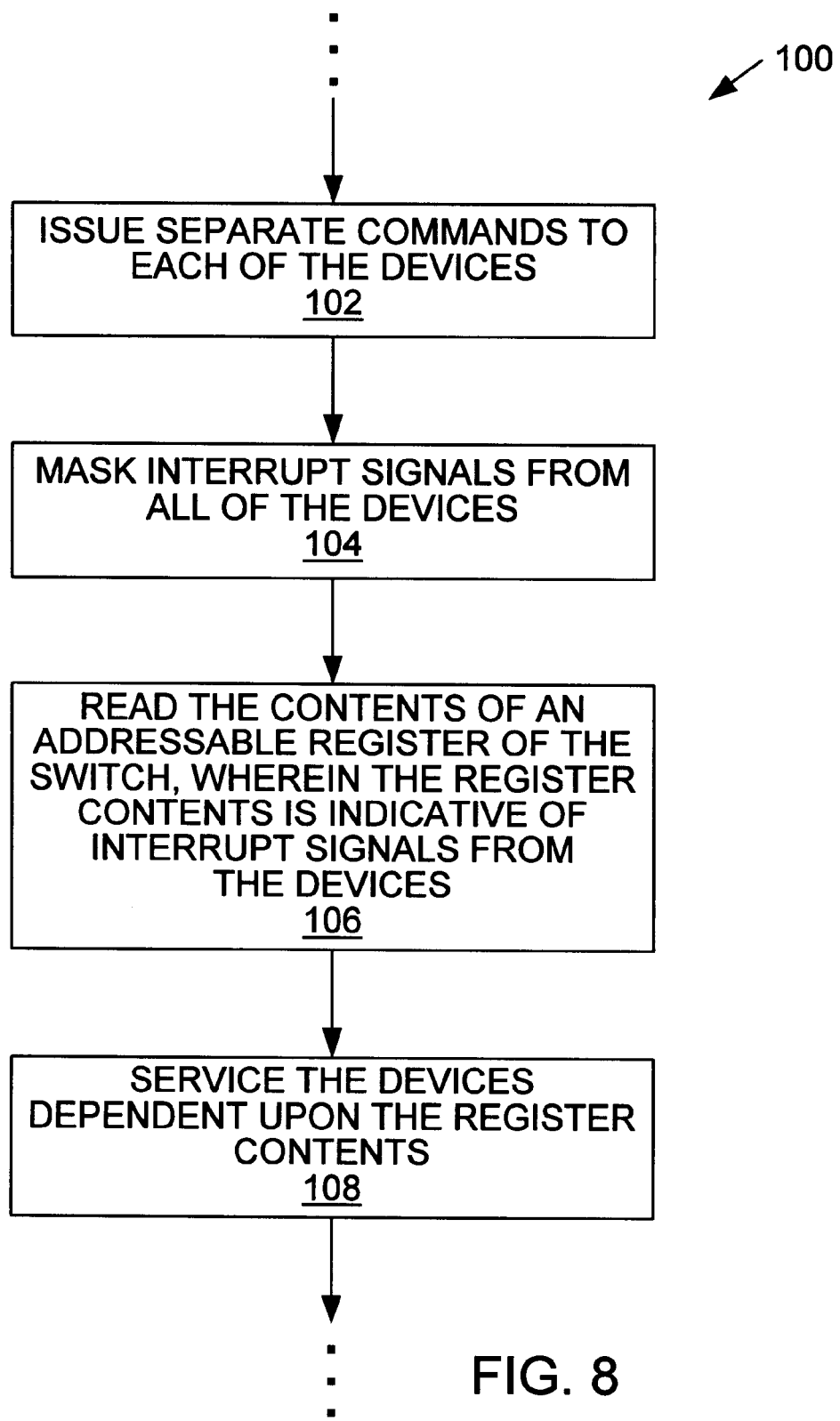
FIG. 8 is a flow chart of one embodiment of a method for exchanging data between the processing unit and multiple devices coupled to device I/O ports of the switch using a third PIO technique, wherein polling is used to service the devices.

FIGS. 6–8 will now be used to illustrate exemplary data exchange methods using different PIO techniques. FIG. 6 is a flow chart of one embodiment of a method 60 for exchanging data between processing unit 12 and multiple devices coupled to device I/O ports 20 of switch 14 using a first PIO technique, wherein several devices may be serviced during execution of a single interrupt service routine. During a step 62, processing unit 12 issues separate commands to each of the devices (e.g., by repeated application of method 50 of FIG. 5 described above). Processing unit 12 receives an interrupt signal from one of the devices (e.g., via the switch), wherein the interrupt signal conveys a request for service, during a step 64. During a step 66, processing unit 12 performs an interrupt service routine in response to the interrupt signal. During the interrupt service routine, interrupt signals from all of the devices may be masked. Processing unit 12 reads the contents of an addressable register of the switch during a final portion of the interrupt service routine, wherein the contents of the register is indicative of interrupt signals from the devices, during a step 68. The register may be, for example, the register of register set 42 mapped to the address of the ATA standard CYLINDER LOW register as indicated in Table 1 and described above. During a step 70, processing unit 12 services the other devices during the final portion of the interrupt service routine dependent upon the contents of the register.

FIG. 7 is a flow chart of one embodiment of a method 80 for exchanging data between processing unit 12 and multiple devices coupled to device I/O ports 20 of switch 14 using a second PIO technique, wherein servicing of the devices is batched by masking interrupts from all but a small subset of the devices. During a step 82, processing unit 12 issues separate commands to each of the devices (e.g., by repeated application of method 50 of FIG. 5 described above). Processing unit 12 masks interrupt signals from all but a select subset of the devices during a step 84. It is noted that the masking may be performed as the separate commands are issued. During a step 86, processing unit 12 receives an interrupt signal from one of the devices within the select subset of devices (e.g., via the switch), wherein the interrupt signal conveys a request for service. Processing unit 12 performs an interrupt service routine in response to the interrupt signal during a step 88. During the interrupt service routine, interrupt signals from all of the devices may be masked. During a step 90, processing unit 12 reads the contents of an addressable register of the switch during a final portion of the interrupt service routine, wherein the contents of the register is indicative of interrupt signals from the devices. The register may be, for example, the register of register set 42 mapped to the address of the ATA standard CYLINDER LOW register as indicated in Table 1 and described above. During a step 92, processing unit 12 services the other devices during the final portion of the interrupt service routine dependent upon the contents of the register. Method 80 batches the servicing of interrupts to reduce interrupt latency. The subset of the devices may be selected in any of various ways to improve the batching.

FIG. 8 is a flow chart of one embodiment of a method 100 for exchanging data between processing unit 12 and multiple devices coupled to device I/O ports 20 of switch 14 using a third PIO technique, wherein polling is used to service the devices. During a step 102, processing unit 12 issues separate commands to each of the devices (e.g., by repeated application of method 50 of FIG. 5 described above). Processing unit 12 masks interrupt signals from all of the devices during a step 104. During a step 106, processing unit 12 polls (i.e., repeatedly reads) the contents of an addressable register of the switch (e.g., when the switch is in the disconnected mode), wherein the contents of the register is indicative of interrupt signals from the devices. The register may be, for example, the register of register set 42 mapped to the address of the ATA standard CYLINDER LOW register as indicated in Table 1 and described above. Processing unit 12 services the devices dependent upon the contents of the register during a step 108.

Figure 9:
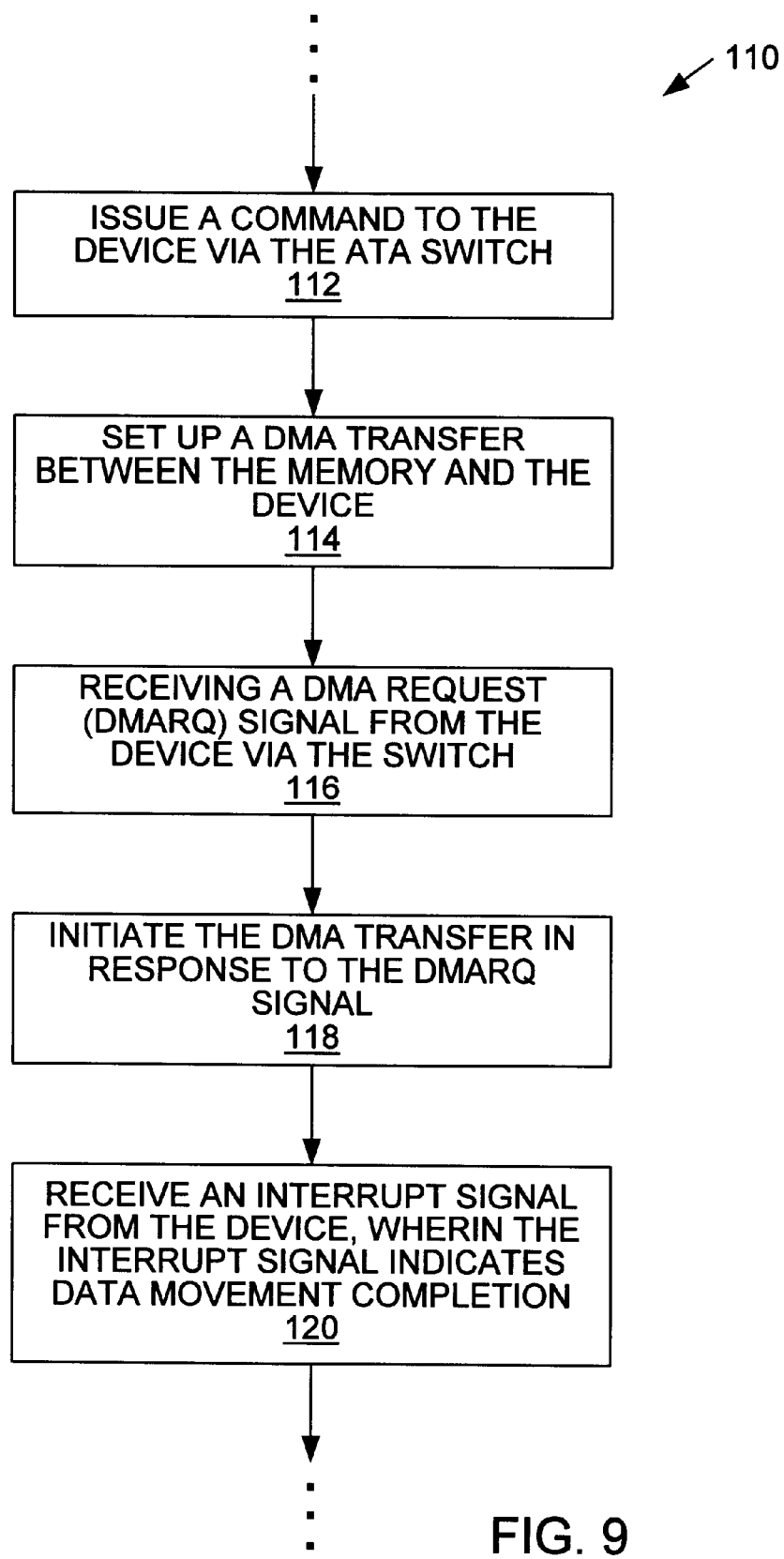
FIG. 9 is a flow chart of one embodiment of a method for moving data between a memory of the processing unit of FIG. 2 and a device coupled to one of the device I/O ports of the switch using a first DMA technique, wherein a DMA transfer is set up while the device is carrying out a command.
Figure 10:
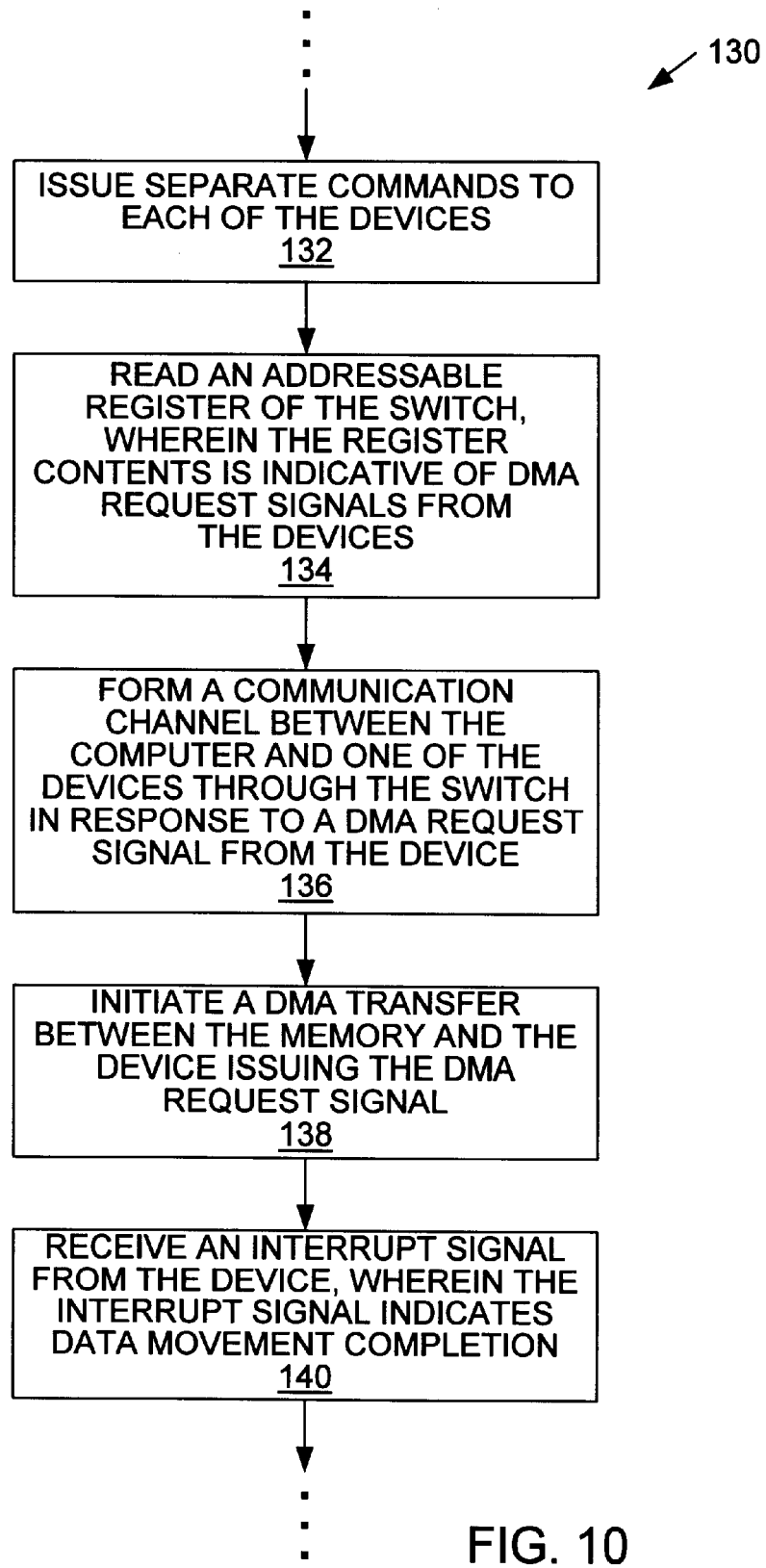
FIG. 10 is a flow chart of one embodiment of a method for moving data between the memory and multiple devices coupled to device I/O ports of the switch using a second DMA technique, wherein DMA transfers are initiated as the devices are ready to move data.
Figure 11:
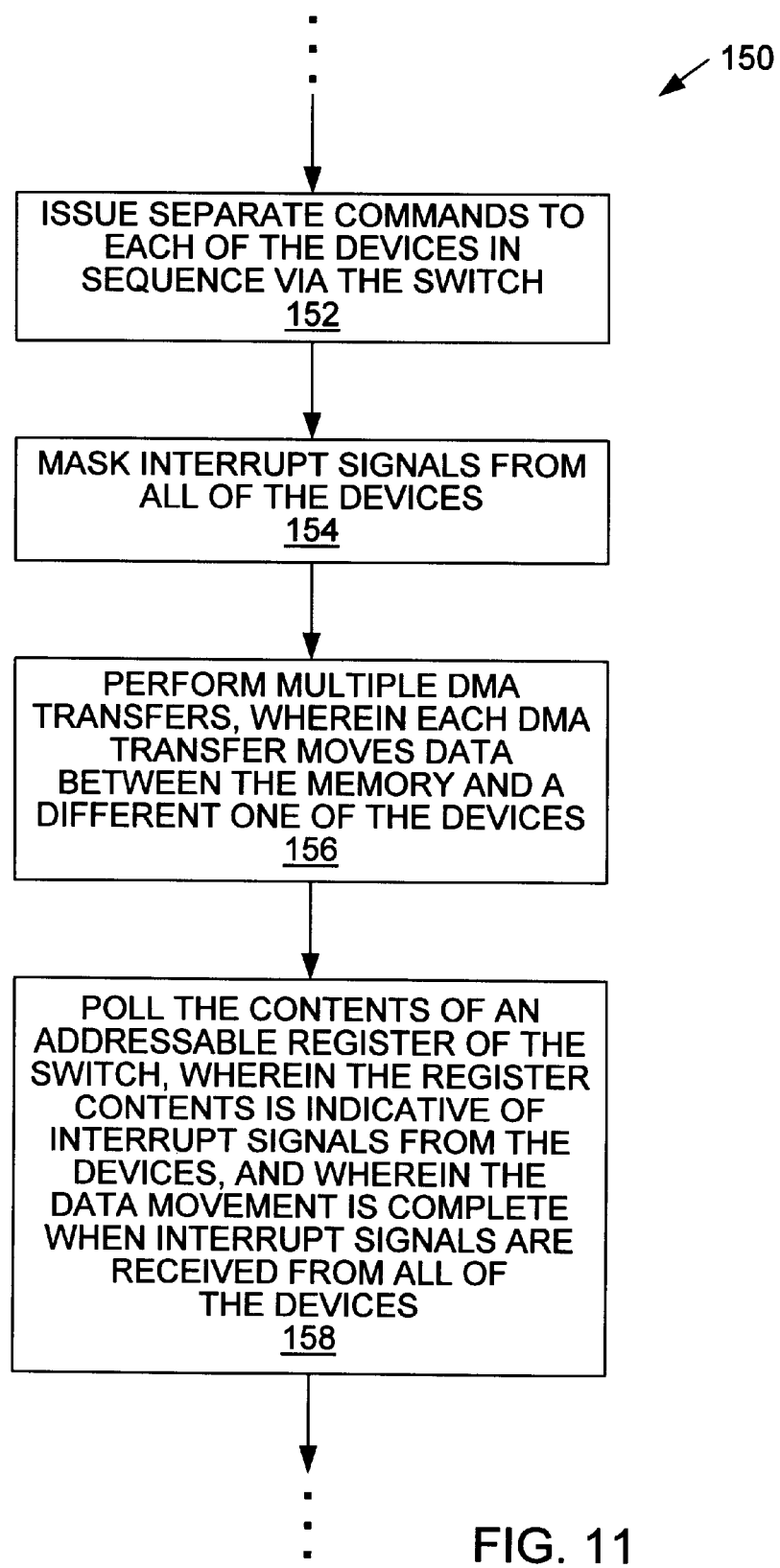
FIG. 11 is a flow chart of one embodiment of a method for moving data between the memory and multiple devices coupled to device I/O ports of the switch using a third DMA technique, wherein a DMA batch method is implemented by masking interrupts from all but a last device receiving a command.

FIGS. 9–11 will now be used to illustrate exemplary methods for moving data between memory 34 (FIG. 2) of processing unit 12 and the one or more devices using different DMA techniques. FIG. 9 is a flow chart of one embodiment of a method 110 for moving data between memory 34 (FIG. 2) and a device coupled to one of the device I/O ports 20 of switch 14 using a first DMA technique, wherein a DMA transfer is set up while the device is carrying out a command. During a step 112, processing unit 12 issues a command to the device (e.g., using method 50 of FIG. 5 described above). Processing unit 12 sets up a DMA transfer between memory 34 and the device during a step 114. For example, CPU 32 (FIG. 2) of processing unit 12 may configure DMA controller 36 (FIG. 2) for the DMA transfer. During a step 116, processing unit 12 receives a DMA request (DMARQ) signal from the device via the switch, wherein the DMARQ signal conveys a request for DMA transfer. Processing unit 12 initiates the DMA transfer in response to the DMARQ signal during a step 118. During the DMA transfer, data is moved between memory 34 and the device via a communication channel formed through switch 14 such that the data passes through switch 14. During a step 120, processing unit 12 receives an interrupt signal from the device (e.g., via switch 14), wherein the interrupt signal indicates data movement completion.

FIG. 10 is a flow chart of one embodiment of a method 130 for moving data between memory 34 (FIG. 2) and multiple devices coupled to device I/O ports 20 of switch 14 using a second DMA technique, wherein DMA transfers are initiated as the devices are ready to move data. During a step 132, processing unit 12 issuing separate commands to each of the devices (e.g., by repeated application of method 50 of FIG. 5 described above). Processing unit 12 polls an addressable register of the switch (e.g., when the switch is in the disconnected mode), wherein the contents of the register is indicative of DMA request signals from the devices, during a step 134. The register may be, for example, the register of register set 42 mapped to the address of the ATA standard CYLINDER HIGH register as indicated in Table 1 and described above. During a step 136, in response to a DMA request from one of the devices, processing unit 12 forms a communication channel between processing unit 12 the device generating the DMA request signal. For example, processing unit 12 may issue a connect command to switch 14 indicating the device I/O port 20 to which the device generating the DMA request signal is coupled. As a result, a communication channel is extended between processing unit 12 and the device generating the DMA request signal through switch 14. Processing unit 12 initiates a DMA transfer between memory 34 and the device during a step 138. During a step 140, processing unit 12 receives an interrupt signal from the device, wherein the interrupt signal indicates data movement completion.

FIG. 11 is a flow chart of one embodiment of a method 150 for moving data between memory 34 (FIG. 2) and multiple devices coupled to device I/O ports 20 of switch 14 using a third DMA technique, wherein a DMA batch method is implemented by masking interrupts from all of the devices and polling interrupt signals to determine when all commands have been completed. During a step 152, Processing unit 12 issues separate commands to each of the devices in sequence via switch 14 (e.g., by repeated application of method 50 of FIG. 5 described above). Processing unit 12 masks interrupt signals from all of the devices during a step 154. During a step 156, processing unit 12 performs multiple DMA transfers (e.g., in response to DMARQ signals received from the devices via switch 14), wherein each DMA transfer moves data between memory 34 and a different one of the devices. Processing unit 12 polls the contents of an addressable register of the switch during a step 158. The contents of the register is indicative of interrupt signals from the devices, and the data movement is complete when interrupt signals are received from all of the devices. The register may be, for example, the register of register set 42 mapped to the address of the ATA standard CYLINDER LOW register as indicated in Table 1 and described above. After the final interrupt is detected by pooling, all the interrupts may be serviced in a batch method in order to clear the interrupts.

Figure 12:
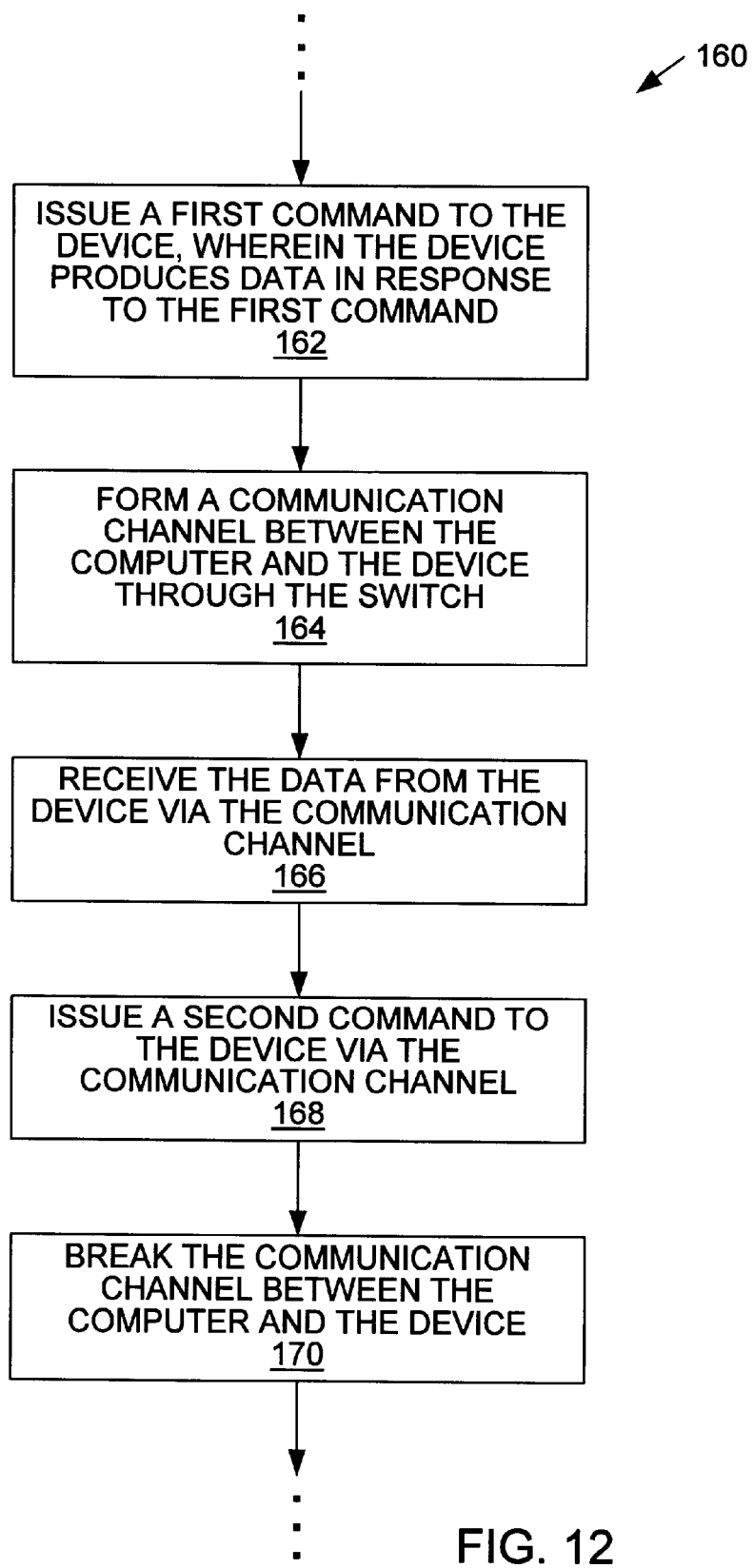
FIG. 12 is a flow chart of one embodiment of a method for exchanging data between the processing unit and a device coupled to one of the device I/O ports of the switch, wherein the method reduces a number of required connect and disconnect processes to the device.

FIG. 12 is a flow chart of one embodiment of a method 160 for exchanging data between processing unit 12 and a device coupled to one of the device I/O ports 20 of switch 14. Method 160 represents an optimization when a number of connect and disconnect processes are performed in sequence to pass commands to the device, and at least one of the commands causes the device to produce data in response. In this case, method 160 reduces the number of required connect and disconnect processes. During a step 162, processing unit 12 issues a first command to the device (e.g., via method 50 of FIG. 5 described above), wherein the device produces data in response to the first command. The device may be, for example, a data storage device, and the first command may be a read command. Processing unit 12 forms a communication channel between processing unit 12 and the device during a step 164. For example, processing unit 12 may issue the connect command to switch 14 indicating the device I/O port 20 to which the device is coupled. As a result, a communication channel is extended between processing unit 12 and the device through switch 14. During a step 166, processing unit 12 receives the data from the device via the communication channel. While the communication channel still exists, processing unit 12 issues a second command to the device via the communication channel during a step 168. During a step 170, processing unit 12 breaks the communication channel between processing unit 12 and the device. For example, processing unit 12 may issue the disconnect command to switch 14. As a result, switch 14 breaks the communication channel between processing unit 12 and the device. It is noted that processing unit 12 may issue other commands to other devices between steps 162 and 164 while waiting for the device to respond.

Numerous variations and modifications will become apparent to those skilled in the art once the above disclosure is fully appreciated. It is intended that the following claims be interpreted to embrace all such variations and modifications.

What is claimed is:

1. A method for exchanging data between a processing unit coupled to a host input/output (I/O) port of a switch and a plurality of devices each coupled to a different device I/O port of the switch, the method comprising:

issuing separate commands to each of the devices via the host I/O port and respective ones of the device I/O ports of the switch, wherein the host I/O port and the device I/O ports are all configured for communicating with the devices according to the same interface standard;

receiving an interrupt signal from one of the devices, wherein the interrupt signal conveys a request for service;

performing an interrupt service routine in response to the interrupt signal;

reading the contents of an addressable register of the switch before completion of the interrupt service routine, wherein the contents of the register are indicative of interrupt signals from the devices; and servicing the other devices before completing the interrupt service routine dependent upon the contents of the register.

2. The method as recited in claim 1, wherein the interrupt signal is received via the switch.

3. The method as recited in claim 1, wherein the register is mapped to an address space assigned to an AT attachment (ATA) standard register.

4. The method as recited in claim 3, wherein the register is mapped to an address space assigned to the ATA standard CYLINDER LOW register.

5. The method as recited in claim 1, wherein during the interrupt service routine interrupt signals from all of the devices are masked.

6. The method as recited in claim 1, wherein said issuing separate commands comprises:
- forming a communication channel between the processing unit and one of the devices, wherein the communication channel includes the switch;
- issuing a command to the device via the communication channel;
- breaking the communication channel between the processing unit and the device; and
- repeating the above for the remaining devices.

7. A method for exchanging data between a processing unit and a plurality of devices via a switch, wherein the processing unit is coupled to a host input/output (I/O) port of the switch and each of the devices is coupled to a different device I/O port of the switch, the method comprising:
- issuing separate commands to each of the devices via the switch;
- masking interrupt signals from all but a select subset of the devices;
- receiving an interrupt signal from one of the devices within the select subset of devices, wherein the interrupt signal conveys a request for service;
- performing an interrupt service routine in response to the interrupt signal;
- reading the contents of an addressable register of the switch before completion of the interrupt service routine, wherein the contents of the register is indicative of interrupt signals from the devices; and
- servicing the other devices before completion of the interrupt service routine dependent upon the contents of the register.

8. The method as recited in claim 7, wherein the interrupt signal is received via the switch.

9. The method as recited in claim 7, wherein the register is mapped to an address space assigned to an AT attachment (ATA) standard register.

10. The method as recited in claim 9, wherein the register is mapped to an address space assigned to the ATA standard CYLINDER LOW register.

11. The method as recited in claim 7, wherein said select subset of the devices are those devices predicted to complete their corresponding commands later than devices not part of said select subset.

12. The method as recited in claim 7, wherein said issuing separate commands comprises:
- forming a communication channel between the processing unit and one of the devices, wherein the communication channel includes the switch;
- issuing a command to the device via the communication channel;
- breaking the communication channel between the processing unit and the device; and
- repeating the above for the remaining devices.

13. A method for exchanging data between a processing unit coupled to a host input/output (I/O) port of a switch and a plurality of devices each coupled to a different device I/O port of the switch, the method comprising:
- issuing separate commands to each of the devices via the switch;
- masking interrupt signals from all of the devices receiving the separate commands so that none of the devices interrupt the processing unit upon completion of the separate commands;
- reading the contents of an addressable register of the switch, wherein the contents of the register is indicative of interrupt signals from the devices; and
- servicing the devices dependent upon the contents of the register.

14. The method as recited in claim 13, wherein the register is mapped to an address space assigned to an AT attachment (ATA) standard register.

15. The method as recited in claim 14, wherein the register is mapped to an address space assigned to the ATA standard CYLINDER LOW register.

16. The method as recited in claim 13, wherein said issuing separate commands to the plurality of devices comprises:
- forming a communication channel between the processing unit and one of the devices, wherein the communication channel includes the switch;
- issuing a command to the device via the communication channel;
- breaking the communication channel between the processing unit and the device;
- repeating the above for the remaining devices.

17. A method for moving data between a memory of a processing unit and a plurality of devices coupled to the processing unit via a switch, wherein the processing unit is coupled to a host input/output (I/O) port of the switch and each of the devices is coupled to a different device I/O port of the switch, the method comprising:
- issuing separate commands to each of the devices via the host I/O port and respective ones of the device I/O ports of the switch, wherein the host I/O port and the device I/O ports are all configured for communicating with the devices according to the same interface standard;
- reading an addressable register of the switch, wherein the contents of the register is indicative of direct memory access (DMA) request signals from the devices;
- setting up a DMA transfer and forming a communication channel between the processing unit and one of the devices in response to a DMA request signal from the device, wherein the communication channel includes the switch;
- initiating said DMA transfer between the memory and the device; and
- receiving an interrupt signal from the device, wherein the interrupt signal indicates data movement completion.

18. The method as recited in claim 17, wherein the register is mapped to an address space assigned to an AT attachment (ATA) standard register.

19. The method as recited in claim 18, wherein the register is mapped to an address space assigned to the ATA standard CYLINDER HIGH register.

20. The method as recited in claim 17, wherein said issuing separate commands to the plurality of devices comprises:
- forming a communication channel between the processing unit and one of the devices, wherein the communication channel includes the switch;

issuing a command to the device via the communication channel;

breaking the communication channel between the processing unit and the device; and repeating the above for the remaining devices.

21. A method for moving data between a memory of a processing unit and a plurality of devices coupled to the processing unit via a switch, wherein the processing unit is coupled to a host input/output (I/O) port of the switch and each of the devices is coupled to a different device I/O port of the switch, the method comprising:

issuing separate commands to each of the devices in sequence via the switch;

masking interrupt signals from all of the devices receiving the separate commands so that none of the devices interrupt the processing unit;

performing a plurality of direct memory access (DMA) transfers, wherein each DMA transfer moves data between the memory and a different one of the devices; and reading the contents of an addressable register of the switch, wherein the contents of the register is indicative of interrupt signals from the devices, and wherein the data movement is completed when interrupt signals are received from all of the devices;

wherein said performing a plurality of DMA transfers and said reading the contents of an addressable register are performed while the interrupt signals from all of the devices receiving the separate commands are masked.

22. The method as recited in claim 21, wherein the register is mapped to an address space assigned to an AT attachment (ATA) standard register.

23. The method as recited in claim 22, wherein the register is mapped to an address space assigned to the ATA standard CYLINDER LOW register.

24. The method as recited in claim 21, wherein said issuing separate commands comprises:

forming a communication channel between the processing unit and one of the devices, wherein the communication channel includes the switch;

issuing a command to the device via the communication channel;

breaking the communication channel between the processing unit and the device; and repeating the above for the remaining devices.

25. A method for moving data between a memory of a processing unit and a plurality of devices coupled to the processing unit via a switch, wherein the processing unit is coupled to a host input/output (I/O) port of the switch and each of the devices is coupled to a different device I/O port of the switch, the method comprising:

forming a communication channel between the processing unit and a device, wherein the communication channel includes the switch;

issuing a first command to the device via the communication channel; and breaking the communication channel between the processing unit and the device subsequent to said breaking, reforming said communication channel between the processing unit and the device;

receiving data from the device via the communication channel in response to said first command; and without breaking the communication channel after the receiving, issuing a second command to the device via the communication channel.

26. The method as recited in claim 25, further comprising: after said breaking and before said reforming:

forming a second communication channel between the processing unit and a second device, wherein the second communication channel includes the switch;

issuing a second command to the second device via the second communication channel; and breaking the second communication channel between the processing unit and the second device.

* * * * *